United States Patent Office 2,774,781
Patented Dec. 18, 1956

2,774,781

METHOD FOR THE PREPARATION OF BENZYLMALONONITRILE

Jerome C. Westfahl, Cuyahoga Falls, Ohio, assignor to The B. F. Goodrich Company, New York, N. Y., a corporation of New York No Drawing. Application September 14, 1953, Serial No. 380,124

8 Claims. (Cl. 260—465)

This invention relates to a new and novel method for the preparation of a cyclic dicyano compound, and more particularly refers to a method for the preparation of benzylmalononitrile.

In my copending application Serial No. 380,123, filed September 14, 1953, the method of preparing methylene malononitrile substituted aromatic compounds and heterocyclic compounds having aromatic properties is disclosed whereby an aromatic compound or heterocyclic compound is reacted with 1,1-dicyano ethylene in the presence of an aluminum halide condensation catalyst, particularly aluminum chloride. In the preparation of the novel compounds of my copending application, it is not necessary that a catalyst activator be utilized in order that 50% or more of the aromatic or heterocyclic compound will react with 1,1-dicyano ethylene. It is therefore quite unexpected to discover that for the reaction of 1,1-dicyano ethylene with benzene to proceed in the presence of an aluminum halide catalyst it is necessary that an activator, such as a hydrogen halide, be present in order to appreciate economical conversion of the reactants and recover a substantial yield of benzylmalononitrile.

It is the object of this invention to provide a method for the preparation of benzylmalononitrile. Another object of this invention is the provision of a method for preparation of benzylmalononitrile whereby substantial yields are obtained by utilizing the action of a hydrogen halide catalyst activator. Another object of this invention is the provision of a simple method for the preparation of benzylmalononitrile which comprises reacting 1,1-dicyano ethylene with benzene in the presence of an aluminum halide catalyst activated by a hydrogen halide activator. Numerous other objects will be apparent from the following description which recites the preferred embodiment of this invention.

The new and novel method of this invention for the preparation of benzylmalononitrile is carried out by reacting benzene with 1,1-dicyano ethylene in the presence of aluminum halide. In carrying out the method or steps of this reaction a hydrogen halide activator is preferably used, although the reaction will proceed in the absence of any activator to produce very low yields of the desired end product. Also, in carrying out the method or steps of this reaction a non-reactive diluent is preferably used, but the reaction will proceed in the absence of any diluent. If desired, a reactive diluent can also be employed. The reactive diluent can be benzene or any other aromatic or heterocyclic liquid. If the reactive diluent is a compound other than benzene a mixture of benzylmalononitrile and methylene malononitrile substituted diluent results.

The reaction of this invention can be described generically as follows:

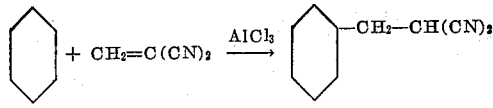

For the reaction to proceed it is necessary to employ a condensation catalyst. The most useful of these is anhydrous aluminum chloride. The amount of catalyst is not especially critical, but it is desirable to use about 2 mols of anhydrous aluminum chloride for each mol of 1,1-dicyano ethylene in order to produce high yields of desired product in a minimum period of time.

As hereinbefore mentioned, in carrying out this reaction with benzene it is desirable to have a hydrogen halide activator, such as hydrogen chloride, present in the reaction medium. Where no hydrogen halide activator is employed in the process of this invention, extremely low yields of benzylmalononitrile ranging from 3 to 15% are recovered. The inclusion of a hydrogen halide activator in the reaction medium increases the yield of benzylmalononitrile to approximately 50–90% based on the available 1,1-dicyano ethylene present in the reaction mixture. The hydrogen halide can be incorporated within the reaction medium by direct addition of extraneously produced hydrogen halide to the suspension of anhydrous aluminum chloride in a reaction solvent or by heating the aluminum chloride suspension, free of any extraneously produced hydrogen halide, at elevated temperatures to obtain a resultant hydrogen chloride evolution in situ from the catalyst suspension in sym-tetrachloroethane. A substitution reaction, such as chlorine substitution of benzene whereby chlorobenzene and hydrogen chloride are prepared, is yet another method whereby a hydrogen halide activator can be incorporated in situ within the reaction medium. The amount of hydrogen halide should be in excess of the amount normally formed by the usual exposure of anhydrous aluminum chloride with the water vapor of the air in opening and sealing the aluminum chloride container.

The temperature at which the reaction proceeds can vary over a wide range. However, because of the highly exothermic nature of the reaction and the tendency of 1,1-dicyano ethylene to homopolymerize at elevated temperatures it is preferred that the temperature be maintained between about −10° C. to 75° C., although temperatures as high as 100° C. can be utilized. To maintain the temperature may require cooling of the reactant mixture during the reaction period.

As hereinbefore mentioned, a solvent or diluent is not essential, but because of the unusual difficulties in maintaining the temperature in the practical range and to prevent recovery of an excessively viscous reaction product a diluent is desirably used. Specific non-reactive solvents which can be used in the operation of this invention include, sym-tetrachloroethane, nitrobenzene and orthodichlorobenzene. Sym-tetrachloroethane is a preferred solvent for the following reasons (1) it has a low boiling point that facilitates its removal from the reaction products if the benzylmalononitrile is isolated by fractional distillation and (2) it is readily obtainable from commercial sources. In addition, benzene, which is a liquid at reaction temperatures, can act as a diluent by employing amounts of about 150 to 200% or more as compared to the stoichiometric requirements.

The method utilized in the preparation of benzylmalononitrile can be carried out in any one of several different manners. For example, 1,1-dicyano ethylene can be admixed with benzene in the desired molar proportions and the mixture brought together with a suspension of aluminum chloride in a solvent or diluent. Another method, that can be successfully employed, is admitting individually benzene and 1,1-dicyano ethylene to a suspension of aluminum chloride in a solvent or diluent. Another method is to bring together a solution consisting of an excess quantity of benzene with aluminum chloride and 1,1-dicyano ethylene. In all of the foregoing reactions or methods described a hydrogen halide promoter, such as hydrogen chloride, can be admixed with the aluminum halide catalyst in order to enhance the yields of benzylmalononitrile.

In the operation of this invention, it is desirable to use benzene free of water in order to diminish the possibility of homopolymerization of 1,1-dicyano ethylene which is inherently susceptible to homopolymerization in the presence of water.

In the operation of this invention, it is believed that a complex is formed which appears to result from a reaction between the aluminum chloride catalyst and the cyano groups of the 1,1-dicyano ethylene. The aluminum chloride-end product complex is desirably hydrolyzed with an acidic solution to release the aluminum chloride of the complex from the benzylmalononitrile. After hydrolysis of the aluminum chloride-end product complex, the benzylmalononitrile can be easily isolated and further purified by fractional distillation preferably at reduced pressures or in some instances by filtration of the precipitated end-product.

The following examples are intended to illustrate the operation of this invention and not to limit it thereto, for there are numerous modifications, of course, which will be readily apparent to those skilled in the art. In the following examples all parts are by weight unless otherwise indicated.

*Example I*

133.3 parts (1.0 mol) of anhydrous sublimed aluminum chloride and 250 ml. of sym-tetrachloroethane, dried by distillation, were placed in a dry glass flask. A solution consisting of 39 parts (0.5 mol) of benzene and 39.0 parts (0.5 mol) of 1,1-dicyano ethylene in solution in 150 ml. of sym-tetrachloroethane (dried as above) was slowly admitted from a dropping funnel to the flask containing the suspension of anhydrous aluminum chloride in sym-tetrachloroethane. The suspension was agitated to secure intimate mixing of the reactants. The reaction temperature was controlled by means of a cold water bath surrounding the reaction flask, and a reaction temperature range was maintained at a temperature of from 36° C. to 40° C. The benzene; 1,1-dicyano ethylene; sym-tetrachloroethane mixture was added to the flask continuously for 30 minutes, and the reactant mixture was stirred for 15 minutes after the final addition. The aluminum chloride-end product complex of the reaction was hydrolyzed by pouring the reaction mixture into a 2-liter beaker containing a mixture of 1-liter of crushed ice and water acidified with 50 ml. of concentrated hydrochloric acid, and the mixture was vigorously stirred. Two liquid layers formed. The upper aqueous layer was washed twice with chloroform and the aqueous layer was discarded. The chloroform extracts were added to the sym-tetrachloroethane solution and the combined solution was washed twice with cold water. The lower or chloroform layer was separated and dried with anhydrous magnesium sulfate, and filtered free of magnesium sulfate. After filtering, the chloroform was removed by distillation at atmospheric pressure until a vapor temperature of 100° C. was reached. The residue, benzylmalononitrile, was largely freed of sym-tetrachloroethane by heating to 50° C. at 0.4 mm. pressure. The crude product was transferred to a 250 ml. flask fitted with a Claisen distilling head and receiver. The product was further distilled to remove the remaining sym-tetrachloroethane at 0.40 to 0.70 mm. pressure until refluxing of the products started. The residue was then distilled to give a 14.7% yield of crude benzylmalononitrile. The crude product was then recrystallized three times from a minimum of boiling ethanol to give an 8.5% yield of purified benzylmalononitrile having a melting point of 90 to 91° C. The composition analyzed as follows:

| Atoms | Calculated | Found |
|---|---|---|
| Percent Carbon | 76.90 | 76.64, 76.99 |
| Percent Hydrogen | 5.16 | 5.14, 5.21 |
| Percent Nitrogen | 17.94 | 17.74 |

*Example II*

39.0 parts (0.5 mol) of benzene and 39.0 parts (0.5 mol) of 1,1-dicyano ethylene in the presence of 133.3 parts (1.0 mol) of aluminum chloride were reacted by the method described in Example I, except that gaseous hydrogen chloride was bubbled through the reaction medium as the reactants were admixed together. The end product-aluminum chloride complex was hydrolyzed, separated from the solvent and a 69.0% yield of crude benzylmalononitrile was isolated by fractional distillation, and after several recrystallizations from alcohol a purified benzylmalononitrile was recovered in an amount equivalent to a 60.8% yield. The purified composition had a melting point of 90 to 91° C.

*Example III*

39.0 parts (0.5 mol) of benzene and 39.0 parts (0.5 mol) of 1,1-dicyano ethylene were reacted by the method described in Example I, with the exception of pretreating the anhydrous aluminum chloride suspension in sym-tetrachloroethane prior to the addition of benzene and 1,1-dicyano ethylene. The catalyst pretreatment consisted of heating anhydrous alumnium chloride suspension in sym-tetrachloroethane to 90° C. over a 30 minute period and then cooling to 45° C., whereby a hydrogen chloride was apparently formed in situ. The end product-aluminum chloride complex was hydrolyzed, separated from the solvent and an 83.6% yield of crude benzylmalononitrile was isolated by fractional distillation, and after several recrystallizations from alcohol a purified benzylmalononitrile was recovered in an amount equivalent to a 51.0% yield. The purified composition had a melting point of 89.5° C. to 90.7° C.

The above examples clearly show that the inclusion of a hydrogen halide activator, such as hydrogen chloride, in the reaction medium gives a 50% to 60% or higher yield of benzylmalononitrile, whereas very low yields are obtained when the method of this invention is practiced in the absence of any activator.

The yields recovered when substituted aromatic or heterocylic compounds are reacted with 1,1-dicyano ethylene in the presence of anhydrous aluminum chloride, as disclosed in my co-pending application Serial No. 380,123, filed September 14, 1953, are not increased by utilizing a hydrogen halide activator in conjunction with the condensation catalyst.

For example, when 1-chloro-4-methoxy-benzene and 1,1-dicyano ethylene are reacted in the presence of an anhydrous aluminum chloride suspension in sym-tetrachloroethane solely, a 54.6% yield of crude 2-methoxy-5-chloro-benzylmalononitrile is recovered. Wherein the reaction of 1-chloro-4-methoxy-benzene with 1,1-dicyano ethylene is carried out in the presence of an anhydrous aluminum chloride suspension in sym-tetrachloroethane which has hydrogen chloride incorporated with said catalyst suspension, a 53.4% yield of crude 2-methoxy-5-chloro-benzylmalononitrile is recovered.

The increase in yield or conversion of benzene from 8.5% or less to about 50 to 60% or higher by including a hydrogen halide along with the aluminum halide catalyst during the reaction of benzene with 1,1-dicyano ethylene is unique for the reaction between pure aromatic benzene and 1,1-dicyano ethylene.

It is to be understood that the above examples are not intended to limit the invention thereto, since variations and modifications therein are within the spirit and scope of the appended claims.

I claim:

1. A method of preparing benzylmalononitrile which comprises reacting benzene with 1,1-dicyano ethylene in the presence of aluminum chloride under anhydrous conditions and hydrolyzing the aluminum chloride-benzylmalononitrile complex.

2. A method of preparing benzylmalononitrile which comprises reacting benzene with 1,1-dicyano ethylene in the presence of aluminum chloride and a diluent under anhydrous conditions and hydrolyzing the aluminum chloride-benzylmalononitrile complex.

3. A method of preparing benzylmalononitrile which comprises reacting benzene with 1,1-dicyano ethylene at a temperature of about −10° C. to about 100° C. in the presence of aluminum chloride under anhydrous conditions and hydrolyzing the aluminum chloride-benzylmalononitrile complex.

4. A method of preparing benzylmalononitrile which comprises reacting benzene with 1,1-dicyano ethylene in the presence of an aluminum chloride, at a temperature of about −10° C. to about 100° C., under anhydrous conditions, the mol ratio of 1,1-dicyano ethylene to aluminum chloride being about 1:2 and hydrolyzing the benzylmalononitrile complex.

5. The method according to claim 1 wherein the reaction is carried out in the presence of a hydrogen halide.

6. The method according to claim 2 wherein the reaction is carried out in the presence of a hydrogen halide.

7. The method according to claim 3 wherein the reaction is carried out in the presence of a hydrogen halide catalyst activator.

8. A method of preparing benzylmalononitrile which comprises reacting benzene with 1,1-dicyano ethylene in the presence of aluminum chloride and a hydrogen halide activator, at a temperature of about −10° C. to about 100° C., under anhydrous conditions, the mol ratio of 1,1-dicyano ethylene to aluminum chloride being about 1:2, hydrolyzing the aluminum chloride-benzylmalononitrile complex and recovering benzylmalononirtile.

References Cited in the file of this patent

Thomas: Anhydrous Aluminum Chloride, in Organic Chemistry (1941), pp. 456–458.